(12) United States Patent
Manjarres

(10) Patent No.: US 9,701,010 B2
(45) Date of Patent: Jul. 11, 2017

(54) WORK CART

(71) Applicant: Frank Manjarres, Vail, AZ (US)

(72) Inventor: Frank Manjarres, Vail, AZ (US)

( * ) Notice: Subject to any disclaimer, the term of this patent is extended or adjusted under 35 U.S.C. 154(b) by 0 days.

(21) Appl. No.: 14/846,666

(22) Filed: Sep. 4, 2015

(65) Prior Publication Data

US 2016/0250747 A1 Sep. 1, 2016

Related U.S. Application Data

(63) Continuation of application No. PCT/US2014/023255, filed on Mar. 11, 2014.

(60) Provisional application No. 61/778,371, filed on Mar. 12, 2013.

(51) Int. Cl.
*B25H 5/00* (2006.01)
*A01B 75/00* (2006.01)
*A47C 9/02* (2006.01)

(52) U.S. Cl.
CPC ............... *B25H 5/00* (2013.01); *A01B 75/00* (2013.01); *A47C 9/027* (2013.01)

(58) Field of Classification Search
CPC ......... A01B 75/00; A47C 9/027; A47C 16/04; A63C 17/00; B25H 5/00; B62B 3/02
See application file for complete search history.

(56) References Cited

U.S. PATENT DOCUMENTS

| | | | |
|---|---|---|---|
| 718,875 A | 1/1903 | Pettersen | |
| 1,382,883 A | 6/1921 | Ashbridge | |
| 2,448,427 A | 8/1948 | Gordon | |
| 3,908,198 A | 9/1975 | Brock | |
| 3,976,155 A | 8/1976 | Esch | |
| 4,377,309 A | 3/1983 | Mengshoel | |
| 4,747,470 A | 5/1988 | Fernandez | |
| 4,772,071 A | 9/1988 | Richards | |
| 4,789,046 A | 12/1988 | McDowall | |
| 4,930,796 A | 6/1990 | Harrod | |
| 5,255,957 A | 10/1993 | Opsvik | |
| 5,380,021 A | 1/1995 | Doherty | |
| 5,427,391 A | 6/1995 | Cooper | |
| 5,535,975 A | 7/1996 | Scott | |
| 5,667,278 A | 9/1997 | Li | |
| 5,870,774 A * | 2/1999 | Legenstein | .......... A41D 13/065 2/24 |
| 5,937,440 A | 8/1999 | Ferriter | |

(Continued)

FOREIGN PATENT DOCUMENTS

DE   20 2011 101 041 U1   8/2011
EP         2526830 A1     11/2012

*Primary Examiner* — John Walters
*Assistant Examiner* — James Triggs

(57) ABSTRACT

The invention comprises a cart for reducing and alleviating ergonomic stresses on the musculoskeletal system of workers in a variety of building trades, including tile setting and grouting, concrete staining, wood floor refinishing, finish carpentry, electrical finishing, plumbing, and others, that require workers to spend extended periods of the working day in compromising and unsupported kneeling positions. The cart is designed to distribute forces along the shinbone of the worker and redirect them from the back, pelvis, keens, ankles and other joints. A further advantage of the cart is the ability to maneuver around the work surface using pivoting shin supports and without the need for repeated standing and kneeling.

14 Claims, 12 Drawing Sheets

(56) References Cited

U.S. PATENT DOCUMENTS

| | | |
|---|---|---|
| 6,219,845 B1 | 4/2001 | Ferriter |
| 6,302,413 B1 | 10/2001 | Comeaux |
| 6,347,404 B1 | 2/2002 | Iskra |
| 6,427,239 B1 | 8/2002 | Worden |
| 6,637,034 B1 | 10/2003 | Worden |
| 6,795,974 B1 | 9/2004 | Howell |
| 6,845,515 B2 | 1/2005 | Sveilich |
| 7,070,241 B2 | 7/2006 | Saulnier |
| 7,080,715 B1 | 7/2006 | Bowlin |
| 7,086,702 B1 | 8/2006 | Hurt |
| 7,152,919 B2 | 12/2006 | Wurzelbacher |
| 7,197,770 B1 | 4/2007 | Warren |
| 9,333,596 B2 * | 5/2016 | Luis y Prado ..... B23K 37/0294 |
| 2004/0003447 A1 | 1/2004 | Sveilich |
| 2004/0094915 A1 | 5/2004 | Warren |
| 2004/0262869 A1 | 12/2004 | Reining |
| 2005/0062242 A1 | 3/2005 | Stone |
| 2005/0120454 A1 | 6/2005 | Cunningham |
| 2005/0120456 A1 | 6/2005 | Cunningham |
| 2005/0225150 A1 * | 10/2005 | Saulnier ................. A47C 7/503 297/423.11 |
| 2006/0277643 A1 | 12/2006 | Legenstein |
| 2007/0096411 A1 | 5/2007 | Rempe |
| 2008/0178492 A1 | 7/2008 | Coomer |
| 2008/0289073 A1 | 11/2008 | Jones |
| 2008/0295213 A1 | 12/2008 | McDaniel |
| 2009/0126066 A1 | 5/2009 | Sasaki |
| 2009/0140567 A1 | 6/2009 | Weiss |
| 2009/0151039 A1 | 6/2009 | Kielland |

\* cited by examiner

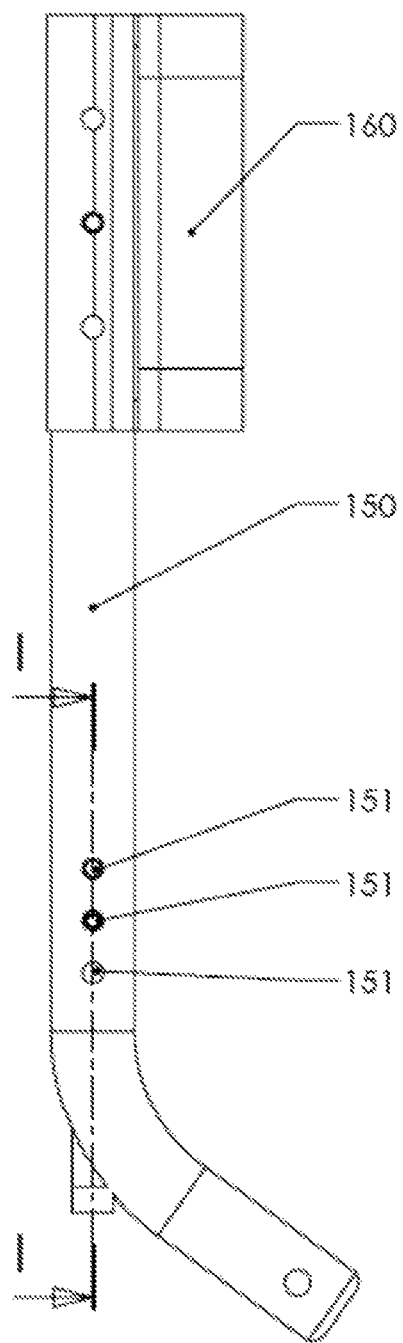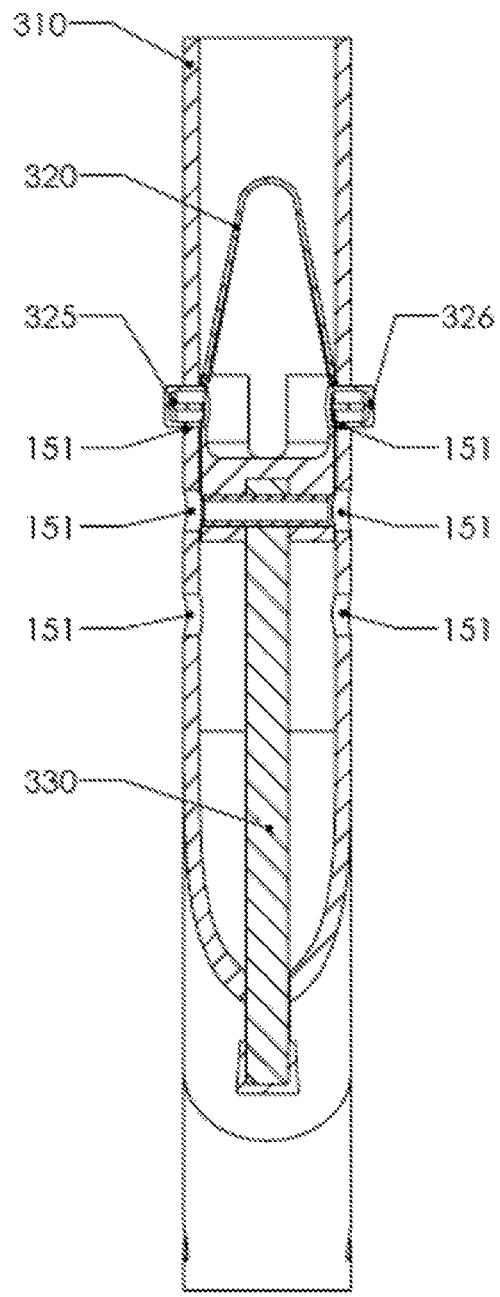
FIG. 5A
FIG. 5B
SECTION I-I

DETAIL II

SECTION III-III

SECTION V-V
ROTATED 180°

DETAIL IV

WORK CART

CROSS-REFERENCE TO RELATED APPLICATIONS

This application is a continuation of PCT/US2014/023255 filed Mar. 11, 2014 which claims priority from U.S. Provisional Application 61/778,371 filed Mar. 12, 2013, the disclosures of which are hereby incorporated by reference in their entireties for all purposes.

FIELD OF THE INVENTION

The present invention is in the area of ergonomic apparatus to reduce and relieve stress on the musculoskeletal system, and to decrease overuse injuries to the joints, tendons and muscles of the feet, ankles, knees, sacral spine, lumbar spine, thoracic spine and cervical spine of workers who are required to spend extended time in a kneeling or squatting position.

BACKGROUND OF THE INVENTION

Many industrial trades such as tile setting and grouting, concrete staining, wood floor refinishing, finish carpentry, electrical finishing, plumbing, and others, require workers to spend extended periods of the working day in compromising and dangerously unsupported kneeling positions. Due to the nature of these jobs, there is associated repetitive stress and pressure on many parts of the body during the workday. The positions the workers must be in have both acute and chronic effects on the health and longevity of the laborer. The prolonged and unsupported stress required to perform these duties can lead to musculoskeletal system overuse injuries. The spectrum of injury can result from deterioration of any of the overused joints, tendons, ligaments and muscles of the feet, ankles, knees, hips, pelvis, sacral spine, lumbar spine, thoracic spine and cervical spine, and neck.

These workers also spend a large amount of time bent over while kneeling. Over a workers lifetime, this secondary prolonged stress only compounds the above musculoskeletal disorders including accelerated osteoarthritis, ligamental and muscular strain, and ligamental and muscle tear. This can be in all of the body parts mentioned above.

Current recommendations from the Occupational Safety and Health Administration (OSHA) call for the use of cushioned kneepads. Yet, cushioned kneepads only address one of the many stresses put on the body and do nothing to alleviate stress on the feet, ankles, hips, pelvis, and spine. They ultimately do little to alleviate anything but moderate to severe knee pain and gross deformation of the knees.

A number of apparatus have been proposed in the past to deal with the stresses on workers knees. U.S. Pat. No. 2,448,427 discloses a knee pad dolly. U.S. Pat. No. 3,976,155 discloses a cart that supports the worker's chest while laying tile. U.S. Pat. No. 5,380,021 and U.S. Pat. No. 5,427,391 disclose knee supports with attached wheels. U.S. Pat. No. 5,870,774, U.S. Pat. No. 5,937,440, U.S. Pat. No. 6,219,845, and U.S. Pat. No. 7,197,770 describe various configurations of strap-on knee pads with wheels. All of these inventions, however, ultimately fall short of alleviating the compounding stressors on the worker's body that can ultimately lead to injury of the unsupported body part directly or indirectly by compensatory overuse.

U.S. Pat. No. 6,302,413 describes a cart with a seat and knee supports. Yet as before, even this apparatus fails to fully alleviate the pressures applied to the worker's knees, Achilles tendon and lower back while working. Further, it does not facilitate stress-free movement around the work area, leading, in turn, to possible further injury.

The present invention seeks to mitigate the long-term risks of acute and chronic pain and arthritis associated with occupations requiring prolonged durations of kneeling, while improving job comfort and performance for workers in such occupations. This apparatus will lead to decreased immediate and long term disability claims and will lead to increased productivity, which is an investment for both labor and management.

SUMMARY OF THE INVENTION

The foregoing and further needs are satisfied by embodiments of the invention.

In some embodiments, the invention comprises a cart with pivotably-mounted shin supports. In other embodiments, the invention comprises a cart with casters and pivotably-mounted shin supports. In some embodiments of the invention the shin supports are capable of flexing to allow the proximal or knee ends to contact the ground or work surface.

In some embodiment, the user is able to reposition the cart on the work surface by alternately weighting and unweighting the proximal or knee ends of the shin supports and moving the shin supports in the direction of desired motion.

In other embodiments of the invention, the shin supports are secured to a rear base member of the cart with torsion mountings. In some embodiments, the torsion mountings allow the user to move the cart in a forward or reverse motion by alternately weighting and unweighting the proximal or knee ends of the shin supports while moving their legs in the direction of desired travel.

In some embodiments, the invention comprises a cart back support adjustable for height and position.

In other embodiments, the invention comprises a cart comprising pivoting casters that allow close approach to a work area.

In still other embodiments, the casters are replaced with stationary feet.

BRIEF DESCRIPTION OF DRAWINGS

FIG. 5A. Side view of an embodiment for adjusting the height of the back support member FIG. 5B. Cutaway view showing an embodiment for the back support height adjustment mechanism FIG. 6. A folded embodiment of the cart FIG. 7. Another folded embodiment of the cart FIG. 8. An embodiment for swiveling caster mounts FIG. 9A. Exploded isometric view of an embodiment of the cart with torsion mounting of the shin supports FIG. 9B. Bottom view of an embodiment of the cart with torsion mounting of the shin supports FIG. 10A. Underside view of an embodiment of the cart enabling movement of the torsion mounts along an arc-shaped path FIG. 10B. Detailed view of arc-shaped slot in an embodiment of the cart enabling movement of the torsion mounts along an arc-shaped path FIG. 10C. Cross-sectional view of an embodiment of the cart enabling movement of the torsion mounts along an arc-shaped path FIG. 11A. Underside view of an alternative embodiment of the cart with low profile using roller casters FIG. 11B. Cross-sectional view of roller caster embodiment FIG. 12A. Exploded isometric view of cart with an alternate embodiment for adjusting the back support member FIG. 12B. Exploded isometric view of an alternate embodiment for back support adjustment mechanism

DETAILED DESCRIPTION OF THE INVENTION

Figure 1:
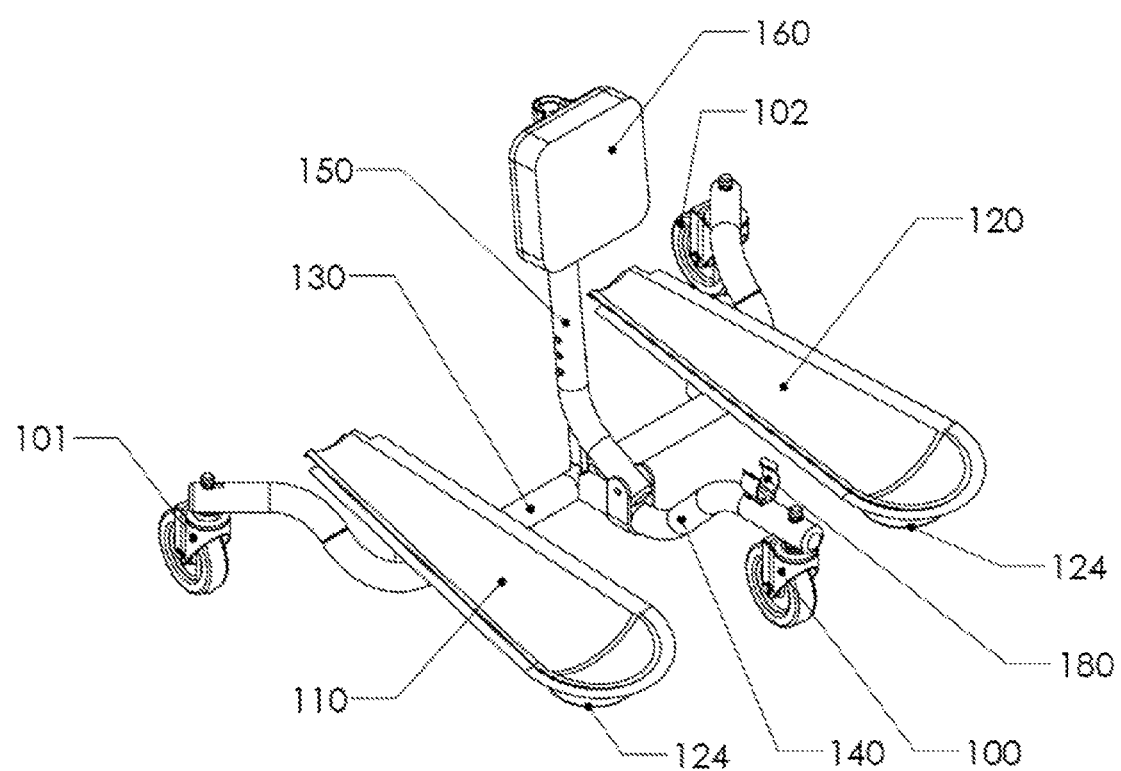
FIG. 1. Isometric view of an embodiment of the cart
Figure 6:
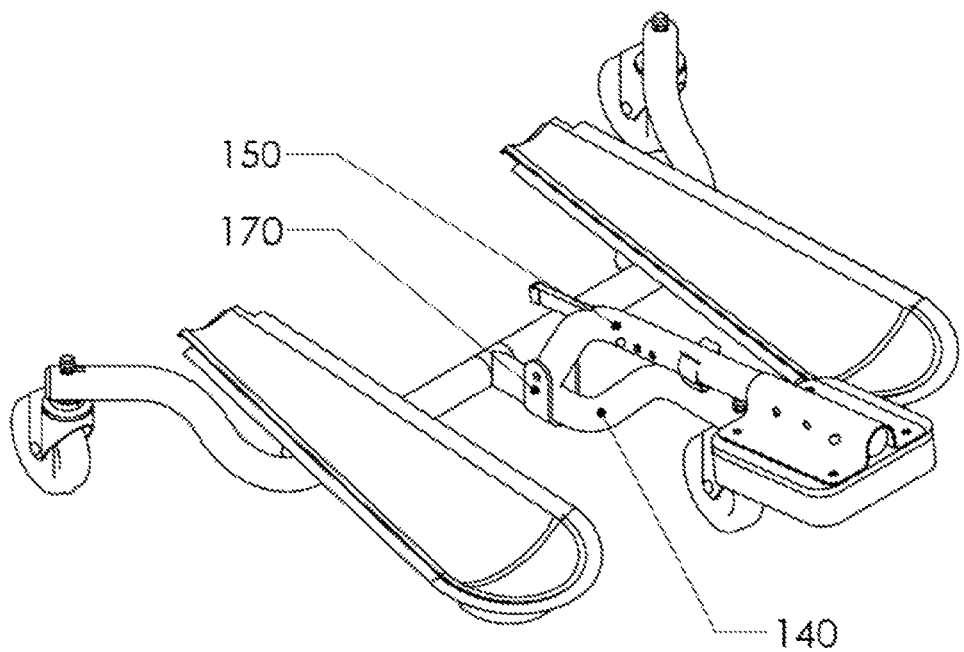

FIG. 1 shows an isometric view of an embodiment of the cart. In some embodiments the cart comprises a basic frame comprising a rear base member 130 with casters 101 and 102 attached to the proximal and distal ends, respectively, and a central base member 140 attached perpendicularly to the rear base member 130 at the central portion of the rear base member 130. As is well known in the art, casters comprise wheels, a frame and axle to hold the wheel, and a mounting pin to facilitate swivel motion. The central base member 140 has a front caster 100 at the proximal end. A back support member 150 is attached to the central portion of the central base member 140 and extends in a substantially vertical direction therefrom. The back support member 150 further comprises a padded back support element 160 attached thereto. There are two shin supports 110 and 120 pivotably mounted on the rear base member 130. The back support member 150 may be hingeably attached to the central base member 140. The hinge 170 allows the height of the back support element 160 to be adjusted as explained below and shown in FIG. 5. The hinge 170 may be further configured to allow the back support member 150 to fold forward, as shown in FIG. 6, facilitating transport and storage of the cart. An optional clamp 180 may be installed on the central base member 140 to hold the back support member 150 in place for storage. Alternatively, a pin to may be used in place of clamp 180 to fasten the back support member 150 in place for storage.

The base members 130 and 140 as well as the back support member 150 may be constructed of any durable material with sufficient strength to support a worker, including, but not limited to, solid or tubular metals, solid or tubular plastics, carbon fiber composites, or even wood or wood composite materials. These elements may be square, round, rectangular, or any cross-sectional shape that promotes adequate structural strength. The elements described may be produced separately and joined together. Alternatively, the base members may be injection molded or produced as a single unit.

The casters assemblies—comprising front caster assembly 100, right-side caster assembly 101, and left-side caster assembly 102—are preferably fully pivoting casters with wheels made of a material appropriate for the surface on which the cart is to be used. Alternatively, a roller caster such that shown and described in FIG. 11C can be used for the front caster assembly 100, the right-side caster assembly 101, and the left-side caster assembly 102. Suitable and desirable wheel materials may include rubber, polyurethane or other plastics, and polymeric materials such as fluoropolymers, acetal copolymers, Teflon®, Delrin®, and the like. The caster assemblies may be mounted for easy removal and replacement as needed due to wear or the desire to install a caster of a different size or material.

The proximal and distal ends of the rear base member 130 as well as the proximal end of the central base member 140 are preferably configured in an arcuate shape, rising in a vertical direction above the wheels or casters. An arcuate shape allows wheels or casters of nearly any size to be attached while maintaining a distance between the bottom of the shin supports 110 and 120 and the ground or work surface so as to allow the grip soles 124 on the under sides of, and at the proximal ends of shin supports 110 and 120 to contact the ground when a user's weight is applied to the knee region of the shin support. When a grip sole 124 on the proximal end of one or both shin supports 110 and 120 touches the ground, the cart is stabilized in position for working or pivoting from one position to another.

In some embodiments of the invention, the arcuate sections of the rear base member 130 and central base member 140 may be removable and replaceable to allow use of the base assembly with casters of different diameters by attaching sections with a greater or lesser arc diameter. This is accomplished by creating separable segments at the proximal and distal ends of the rear base member 130 and at the proximal end of the central base member 140.

Figure 2:
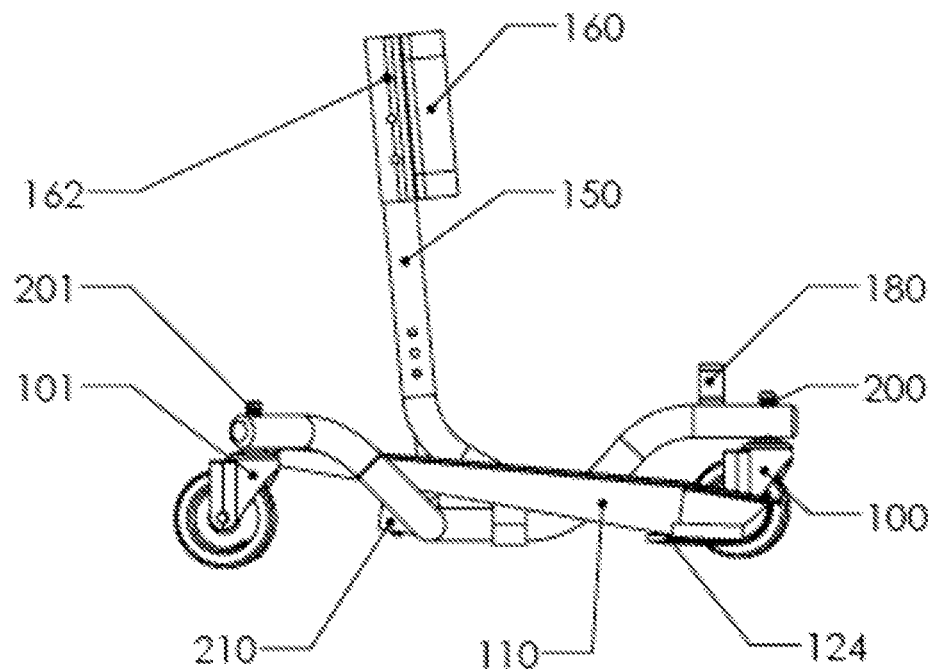
FIG. 2. Side view of an embodiment of the cart

FIG. 2 shows the side view of an embodiment of the invention. FIG. 2 shows, in particular, the front caster assembly 100 and the right caster assembly 101. Each of the caster assemblies 100, 101, and 102 may be mounted through holes in the central base member 140 and rear base member 130. The holes may extend completely through the base members with the casters held in place by retaining rings, shown in the figure as 200 and 201. External snap rings, or other mounting approaches such as threaded stem, welded, and flange-mounted with nuts and bolts may also be used. Alternatively, the caster mountings may be contained completely inside the respective base members. In some embodiments, a roller caster can be located in the central base member and held captive by a retainer, such as that show and described in FIG. 11C. In still other embodiments, the casters may be replaced by feet mounted in the same positions, resulting in a cart that does not move yet still provides the same ergonomic stress relief for workers performing tasks in a kneeling position. The feet can be made from plastic, rubber or metal and can be mounted in place of the casters or directly at the ends of the arcuate portions of the base members.

In some embodiments, a kit containing a plurality of arcuate base member sections, casters of various sizes and materials, and feet for a variety of work surfaces is provided with or without a basic base frame comprising the rear base member 130, the central base member 140 and the back support member 150 with a back support 160. The kit may also include replacement back support members 160 of the same or alternate sizes and materials.

The back support 160 may be mounted in a fixed position or adjustably mounted to the back support member 150. The position of the back support 160 may be adjusted along the back support member 150 by the back support adjustment 162. This is further illustrated in FIG. 5. In other embodiments, the back support 160 maybe shaped ergonomically and may further comprise padding made from materials with appropriate shape and durometer to support even distribution of the user's mass. These materials may include, but are not limited to, silicones, rubbers, and polymeric foams.

Figure 3:
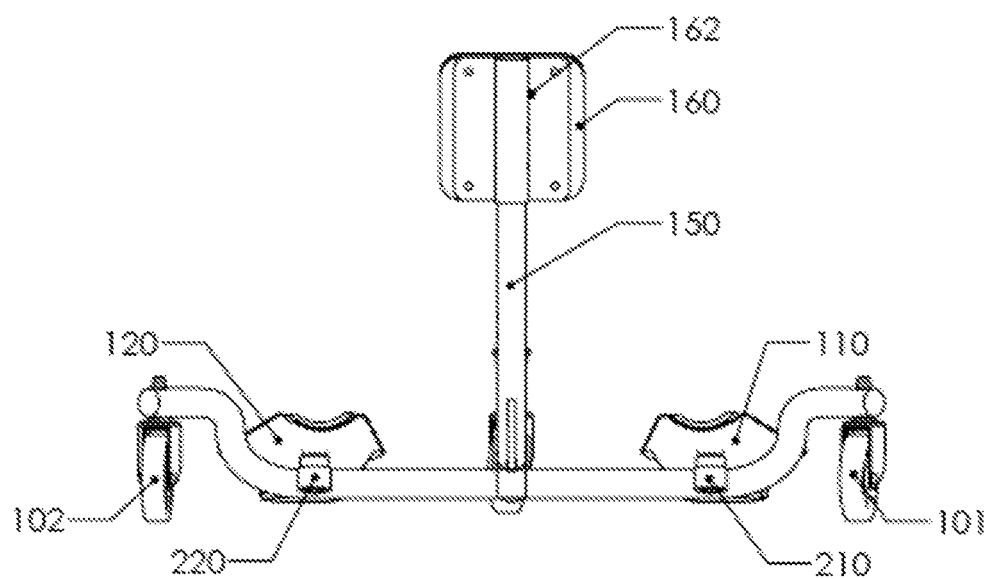
FIG. 3. Rear view of an embodiment of the cart

FIG. 3 shows a rear view of an embodiment of the invention. The shin supports 110 and 120 are pivotably mounted on the rear base member 130. The mounting interface may be made using externally bonded collars and mountings or internally to the rear base member 130 with holes in the rear base member 130. While FIG. 3 shows one mounting assembly for each shin support, 210 and 220 respectively, one of skill in the art will readily recognize that multiple mounting assemblies and mounting positions can be made along the rear base member 130 to accommodate users with various statures, and larger or smaller body sizes.

In some embodiments, the invention comprises a cart with a plurality of mounting assemblies for shin supports.

Figure 4A:
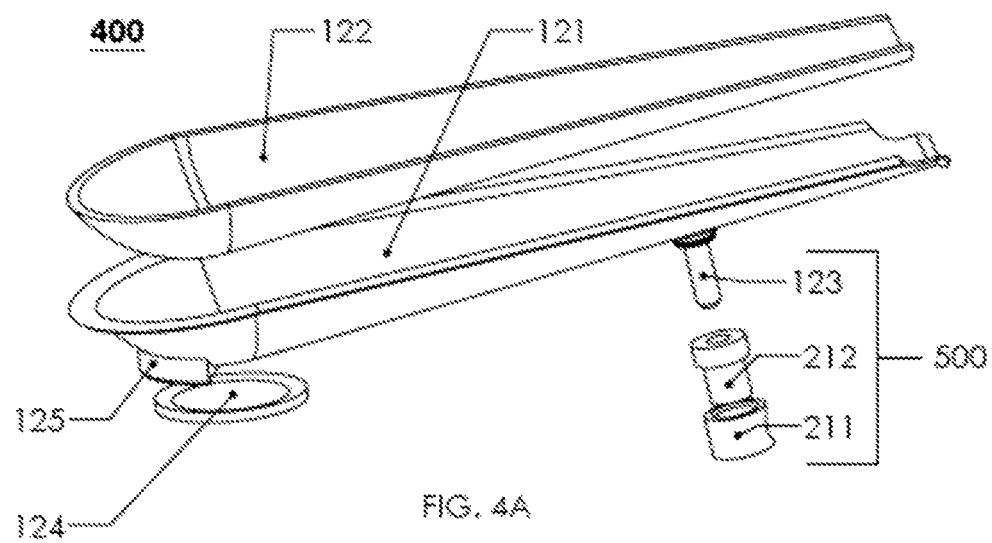
FIG. 4A. Detailed view of an embodiment for a shin support and mounting

FIG. 4A shows an exploded view of a single shin support assembly 400. FIG. 4A also shows a shin support mounting assembly 500. In some embodiments, the invention comprises a cart with two shin support assemblies.

A shin support assembly comprises a shin support 121, optional padding 122, a grip sole 124. In some embodiments the shin support further comprises a grip sole mounting 125. In other embodiments, the grip sole 124 is directly attached to the shin support 121. In other embodiments, the grip sole 124 is an integral part of the shin support 121.

One of skill in the art will no readily recognize that the shin support 121 may have varying geometry capable of supporting different users. Each shin support assembly 400 may further comprise padding 122 made from materials with appropriate shape and durometer to support even distribution of the user's mass. These materials may include, but are not limited to, silicones, rubbers, and polymeric foams.

A shin support assembly 400 further comprises a mounting assembly 500, an exploded view shown in FIG. 4A. Mounting of each shin support assembly 400 may be accomplished with mounting assembly 500 comprising a mounting rod, or pin, 123 affixed to the shin support 121, a collar 211 externally connected to the rear base member 130, and bushing 212 inserted in the collar. Alternatively, the bushing 212 may be mounted internal to the rear base member 130, eliminating the need for the external collar 211, or with a reinforcing collar inserted internally to the rear base member 130. The mounting assembly 500 for the shin supports, whether internal or external to the rear base member 130, allows the user to independently move each leg as needed and to contact the grip sole 124 on the under side of, and at the proximal end of each shin support assembly 400 with the work surface, floor, or ground as needed to stabilize the position of the cart or move from one location to another. The bushing 212 is preferably a T-bushing, however other bushing configurations may be employed. The bushing 212 can be made of rubber or other material sufficiently rigid to form an interference fit with the mounting rod 123 but with sufficient flexibility to allow the bushing 212 to compress when the user's weight is applied and to flex forward slightly to allow the grip sole 124 on the proximal end of a shin support assembly 400 to touch the ground when weight is applied to the knee region.

In some embodiments, the shin support mounting assembly 500 can be configured and installed within an arc-shaped slot as shown and described in FIG. 10.

The grip soles 124 may be made from materials such as polytetrafluoroethylene (also known as PTFE or Teflon®), rubber, or other plastics or materials appropriate to avoid marring work surface finishes. The grip soles 124 are preferably replaceable for wear or for use on a different work surface.

In some embodiments, the grip sole 124 is mounted in a grip sole mount 125 to allow rotation about its axis. This rotation allows the user to pivot the cart on the contact point of the grip sole 124 with the work surface, and makes it easier to move about the work area.

The right-side shin support 110 and left-side shin support 120, collectively referred to as shin supports, are configured to individually cradle the legs of the user from just above the foot up to the knee region of the leg. A user, kneeling in the cart, will rest his or her lower back against the back support 160. In doing so, the forces and stresses otherwise directed fully to the ankles and knees of a person kneeling on a hard surface or with kneepads, become distributed evenly along the nearly horizontal shinbone. When the user wishes to move the cart across the work area, he or she simply alternates weighting and unweighting of the knees, which in turn weights and unweights the proximal end of the shin supports, and moves their legs in the direction they wish to go. Contacting the grip soles mounted on the proximal ends of the shin supports 110 and 120 with the ground serves to stop movement and stabilize the cart in position for working.

In some embodiments of the invention, the shin supports assemblies 400 are not pivotably mounted. They are fixed in position and the user employs other means for moving about the work area, such as pushing the cart by hand. These embodiments still provide the user with the stress-relief benefits of the cart.

Each shin support 121 in a shin support assembly 400 can be made from a variety of materials, including but not limited to, molded plastics, composites, carbon fiber material, or shaped metal so as to form a cradle for the shin portion of the users' legs. Additionally, the shin support 121 may be made in various geometries to specifically accommodate users of various sizes and statures. In some embodiments, padding is added to the shin supports to further cushion and relieve stress that may be exerted on the user's legs, ankles, and knees. In still other embodiments, the padding is removable for replacement for wear or for accommodating a different user.

Figure 4B:
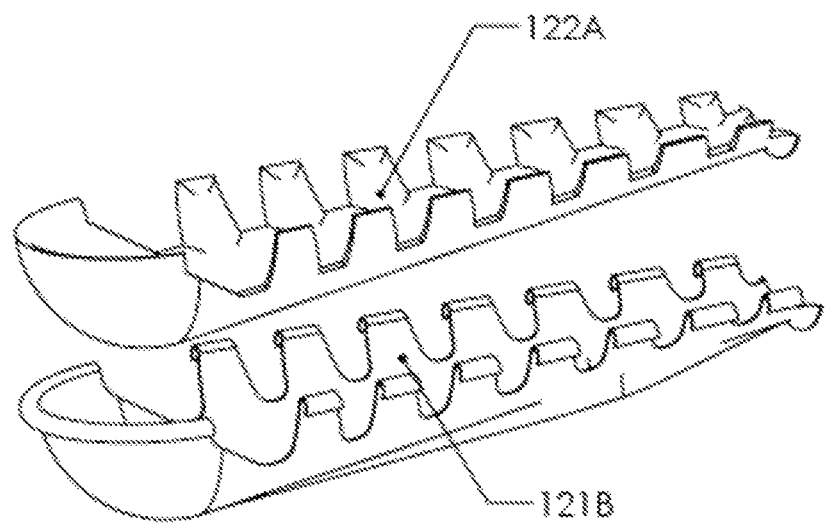
FIG. 4B. Detailed view of an embodiment for a self-adjusting shin support

FIG. 4B shows another embodiment for the design and construction of a shin support 121 and the optional shin support padding 122, respectively depicted as 121b and 122a. The embodiments depicted in FIG. 4B are formed to be self-adjusting to the users shin. In these embodiments, the application of force by the users shin causes the sides of the shin support to contract or expand, there by adjusting more closely to the shape of the shin. The expansion or contraction function is accomplished by the scalloped design of the sidewalls of the support as shown in FIG. 4B. This feature provides further comfort and thus stress relief. The self-forming shin supports may be incorporated into any of the embodiments disclosed herein. Materials such as metal or resilient plastics may be formed in the manner shown in FIG. 4B.

FIG. 5A shows an embodiment of the back support member 150. A plurality of adjustment holes 151 serve as adjustment points for the height of the back support. One of skill in the art will readily realize that any number of holes, more or less than the three holes shown, may be employed to accommodate construction of carts of various sizes. FIG. 5B is a cross-sectional view of an embodiment an adjustment mechanism. A leaf spring 320 is configured with detents alignment pins 325 and 326 on each end. The detents alignment pins 325 and 326 engage with holes 151 as appropriate to adjust the height of the back support member 150. A height adjusting element 330 rests between the leaf spring 320 and the rear base member 130. Adjusting the leaf spring 320 changes the position of the height adjusting element 330 and causes the height of the back support member 150 to change as it pivots on the hinge 170. One of skill in the art will readily recognize that other mechanisms may be employed to adjust the angle and height of the back support member 150. Other methods known in the art that may be used to adjust the height of the back support member 150 include jackscrews, scissor hinge, and external adjustment pins, interlocking splines, ratcheting gear teeth, and the like.

In some embodiments of the invention, the back support member 150 is adjustable. In other embodiments, the back support member is in a fixed position.

In some embodiments the position of the back support 160 may be adjusted up or down to further accommodate users of varying size and stature. A variety of height adjustment mechanisms are possible, including a leaf spring and detent assembly similar to that shown for adjusting the position of the back support member 150. Other mechanisms are known in the art such as quick pinning, set screws, and adjustable clamps.

In some embodiments, the back support 160 may be mounted to allow pivoting in the vertical direction about the adjustment point. In still other embodiments, the back support is configured to pivot in the horizontal direction, or in both the vertical and horizontal directions.

FIG. 6 shows an embodiment of the invention wherein the hinge assembly 170 allows the back support member 150 to be folded completely forward. This embodiment allows for easy carrying or storage of the cart. Any number of clamping mechanisms known in the art may be employed to retain the back support member 150 to the central base member 140.

Figure 7:
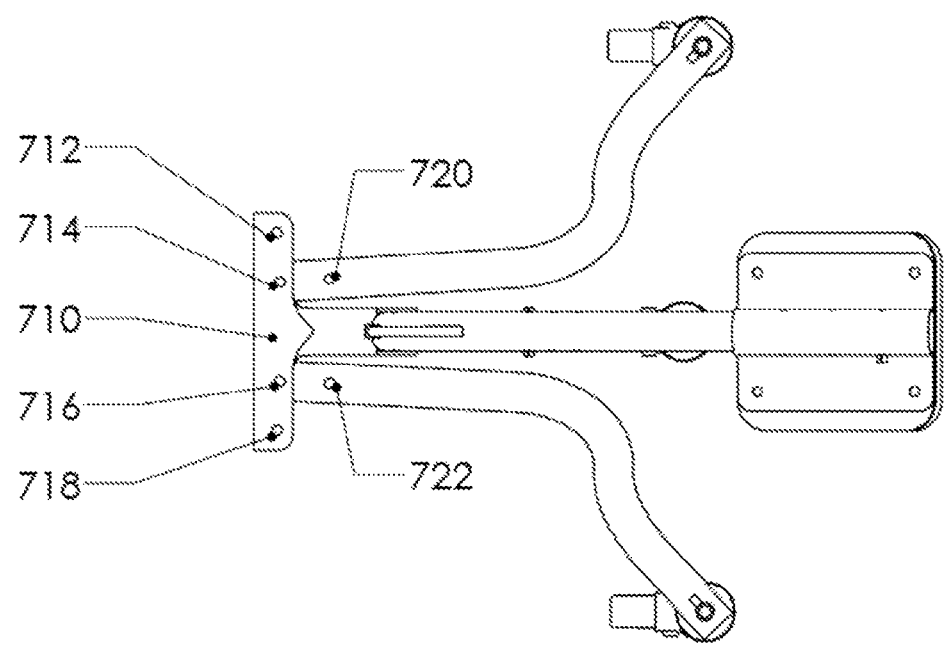

FIG. 7 depicts yet another embodiment of the cart wherein the rear base member 130 is constructed to fold when not in use. In some embodiments, a rear member hinge assembly 170 comprises detent holes 712 and 718 and rear base member pivots 714 and 716. Spring-loaded detents 720 and 722 are arranged to engage and disengage with the detent holes 712 and 718 to allow the rear base member 130 to lock into an open position or fold closed as shown in FIG. 7.

In another embodiment of the invention the spring-loaded detents are replaced with removable pins or screws that protrude through the holes 714 and 720 on one side and through the holes 718 and 722 on the other side. One of skill in the art will readily appreciate other hinging and locking mechanisms known in the art to allow opening and closing of the rear base member 130.

Figure 8:
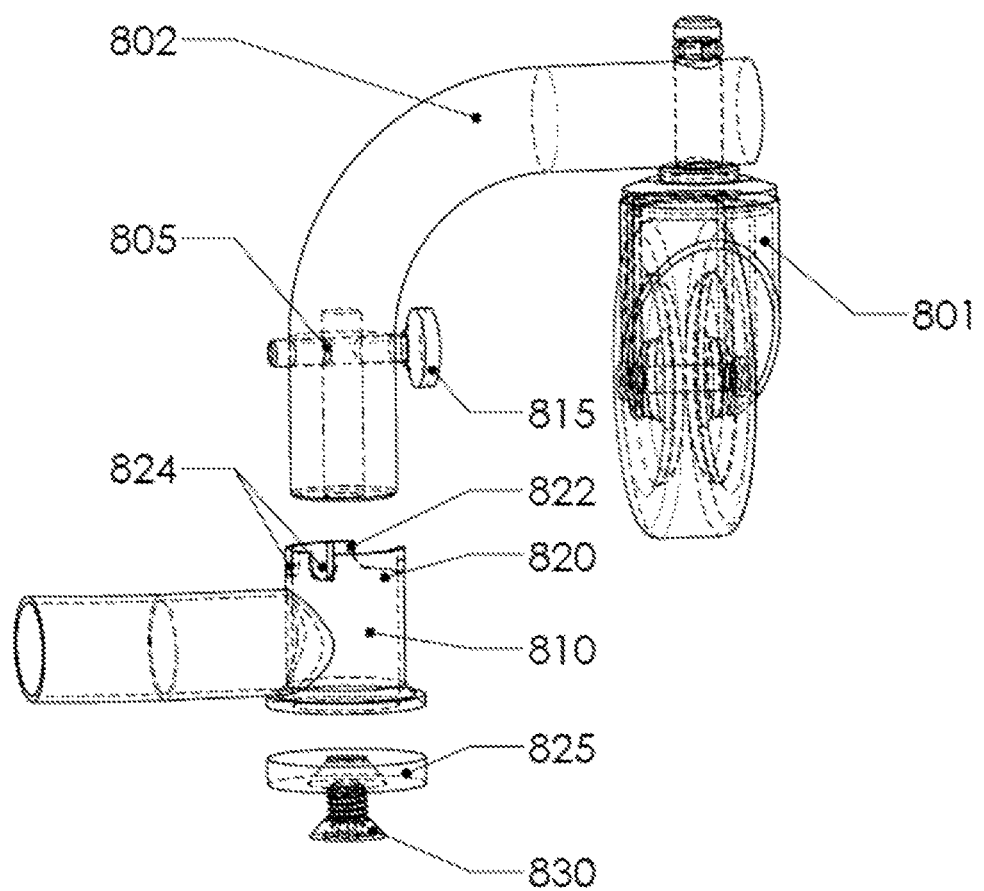

FIG. 8 shows an embodiment for the caster assemblies 101, 102, and optionally 100 wherein the overall horizontal profile, or footprint, of the cart may be controlled or reduced. In some embodiments the casters 801 pivot away from the work area thus making it possible for the user to move closer to the work area. A swivel joint 810 is placed at the proximal and distal ends of the rear base member 130 before the arcuate section previously described. The motion of the swivel joint 810 is limited by a guide pin 815 that is held in place by a roll pin 805. Roll pin 805 limits the travel of the guide pin 815. Guide pin 815 can be retracted to allow the caster mounting arm 802 to rotate about it axis in guide slot 820 until engaging the pocket shoulders 822 of the swivel joint 810. In some embodiments the guide pin 815 is fully inserted and penetrating thru both walls of the swivel joint 810 into two or more fixed positions 824, to fix the caster swivel arm 802 in a fully open position or a fully closed position. The fully open position provides the cart with a larger footprint and the fully closed position reduces to footprint of the cart. One of skill in the art will now appreciate that additional fixed positions may be added to enable additional fixed caster positions and a number of fixed footprints for the cart. The caster mounting arm may be held in place by a flat head fastener 830 and a thrust washer 825. Alternative mechanisms to the guide pin 815 include, but are not limited to, roll pins, screws, shoulder bolts.

Figure 9A:
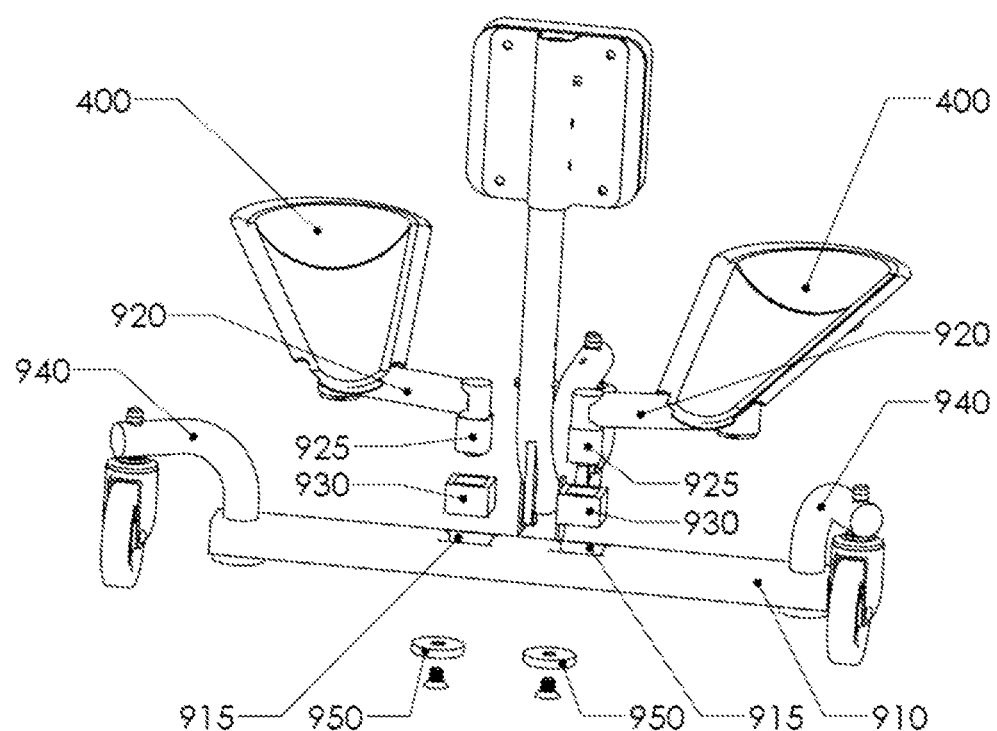
Figure 9B:
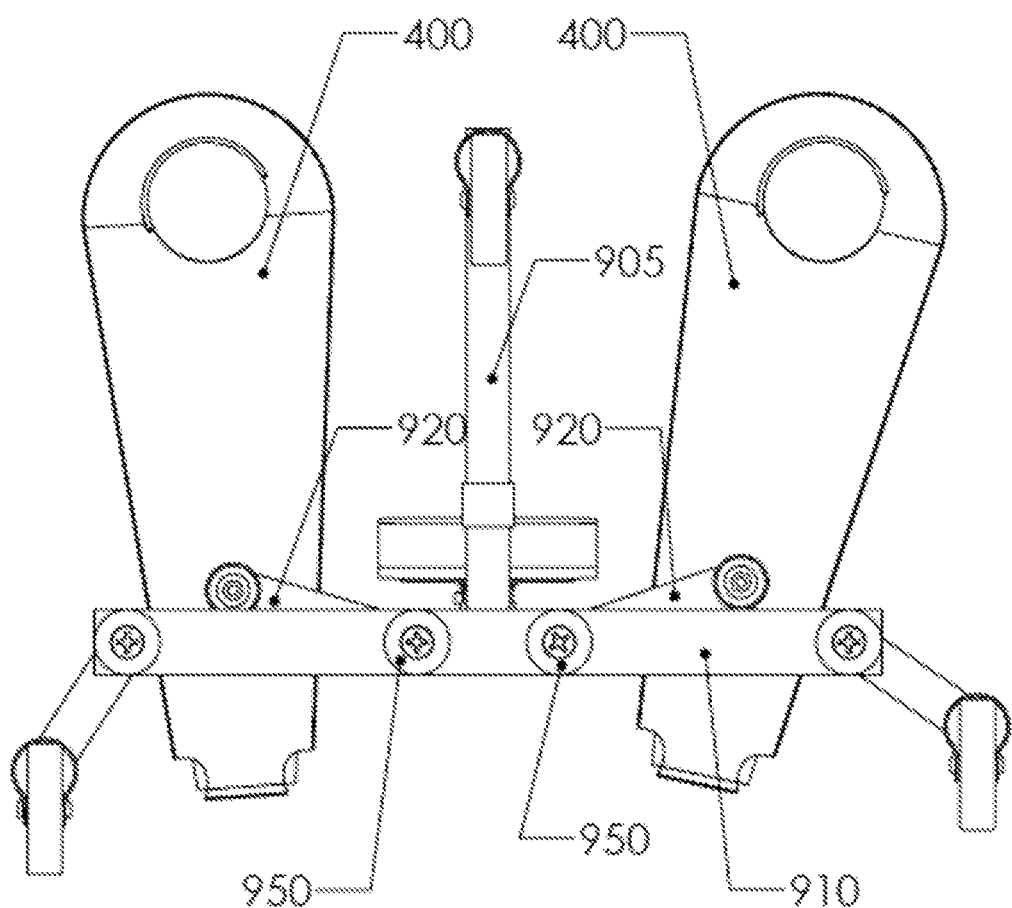

FIGS. 9A and 9B show an exploded isometric view and a bottom view, respectively, of yet another embodiment of the invention. In this embodiment, the shin support assemblies 400 are mounted to a rear base member 910 by torsion rods 920 secured in torsion-producing mounting joints. The torsion-producing mounting joints comprise a square torsion collar 925 on the end of the torsion rod 920, a square rubber mounting collar 930 positioned in a mounting position 915 on the rear base member 910. In some embodiments, the torsion collar and mounting collar are square. In other embodiments, the torsion collar and mounting collar are rectangular, and in still other embodiments, the torsion collar and mounting collar are any polygonal shape.

The rear base member is preferentially made from a rectangular tube or channel, however other shapes may be used, such as the cylindrical shape previously described. The rear base member may contain a plurality of mounting positions 915 as needed to accommodate users of various sizes and statures. The torsion producing joints may be retained in place by any of a number of fastening techniques to allow for secure but repositionable connections, including a screw and washer 950. Caster assemblies as previously described may be used in this embodiment. The central base member 905 and the caster assemblies 940 may also be made as previously described. Alternatively, the rear and central base members may be injection molded or produced as a single unit.

In use, torsion is created by the torsion collar 925 as it twists in the square rubber mounting collar 930 positioned in the rear base member in mounting position 915. Forward motion of the unweighted shin support produces torsion in the joint on the opposite side. When the user shifts his or her weight to the opposite shin support, the torsion causes the newly unweighted side of the cart to move in a forward direction, thus allowing the user to engage in a forward walking-like motion by alternately unweighting, advancing, and weighting the shin supports.

In some embodiments, the shin supports are pivotably mounted to the torsion rods as previously described. In other embodiments the shin supports are fixed in position on the torsion rods.

One of skill in the art will readily see other mechanisms to produce the torsion needed to move the cart as described.

Figure 10A:
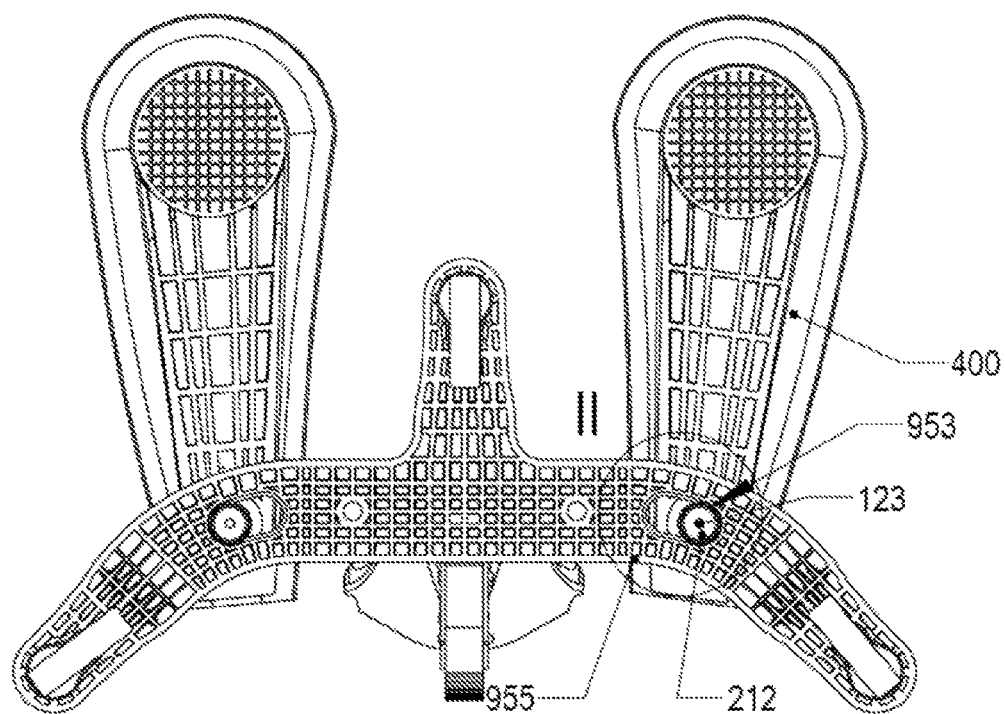
Figure 10B:
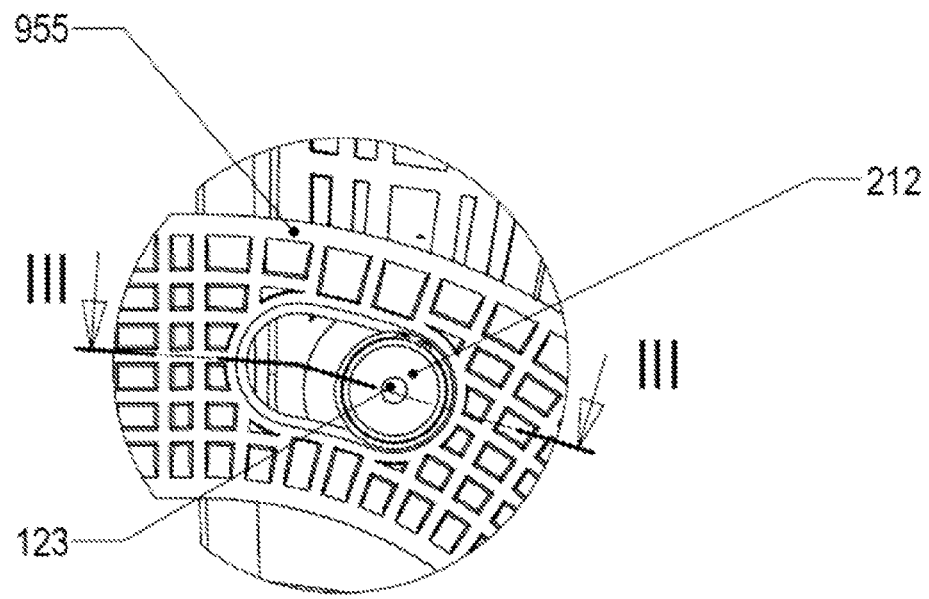
Figure 10C:
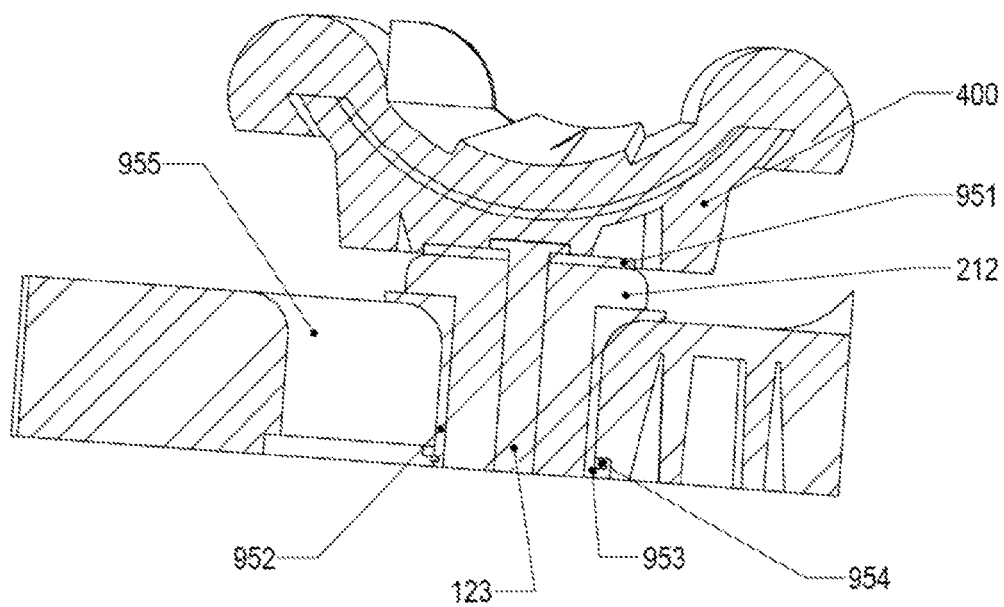

FIGS. 10A, 10B, and 10C show an embodiment with a unitized rear and central base member 955. Such a portion may be made by injection molding of plastic or other polymeric materials or by cutting the shape from metal or other sufficiently strong material. FIGS. 10A, 10B, and 10C further depict an embodiment wherein the shin support assemblies 400 are mounted to a combined rear and central base member 955. Slots in the base member allow each shin support to travel along an arc-shaped path at the distal end. The arc-shaped travel can be facilitated using methods such as T-bushing rollers 952 installed in arc-shaped guide slots contained in the base member as shown in FIG. 10A. A thrust washer 954 and a T-roller bushing 952 are held captive, using an external snap ring 953 or similar fastening methodology. In use, the thrust washers and T-roller bushings rotate, guided by the arc-shaped slot in the base member.

Figure 11A:
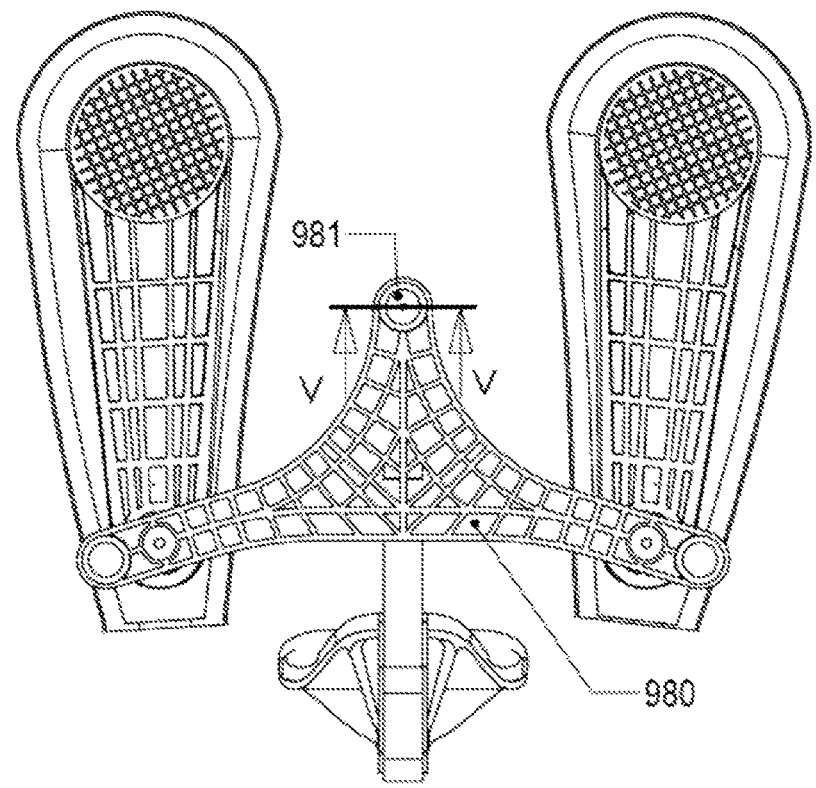
Figure 11B:
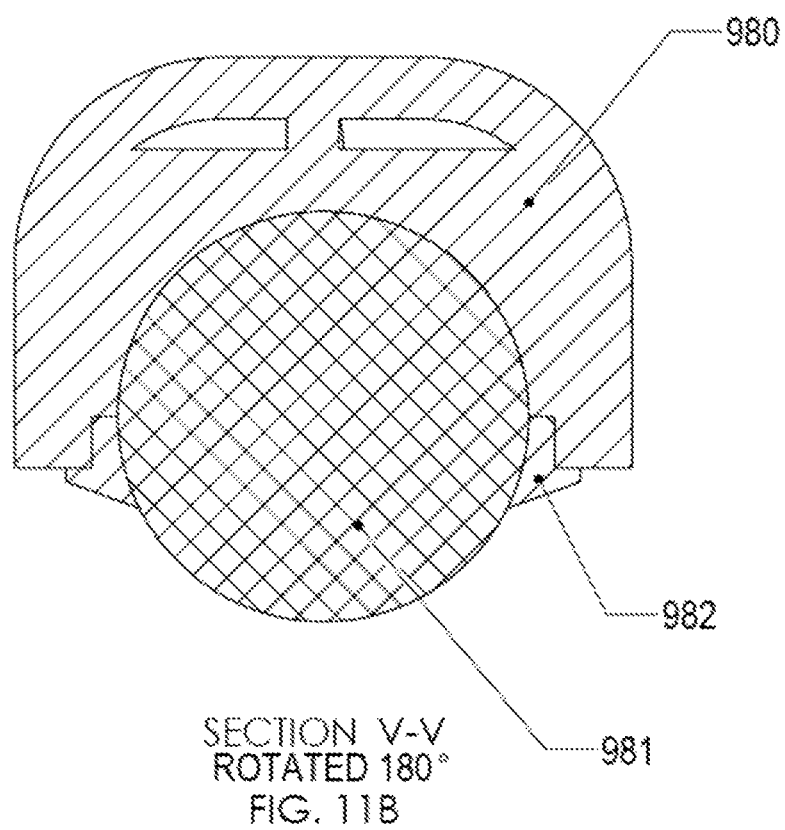

FIG. 11A shows yet another embodiment with a unitized rear and central base member 980. FIG. 11A illustrates the underside view of the base member 980 and one of the three casters indicated as 981. FIG. 11B illustrates a roller caster 981 held in place with a retaining ring 983. Roller casters can advantageously provide a lower profile for the cart and allow the user to get closer to the work area.

Figure 12A:
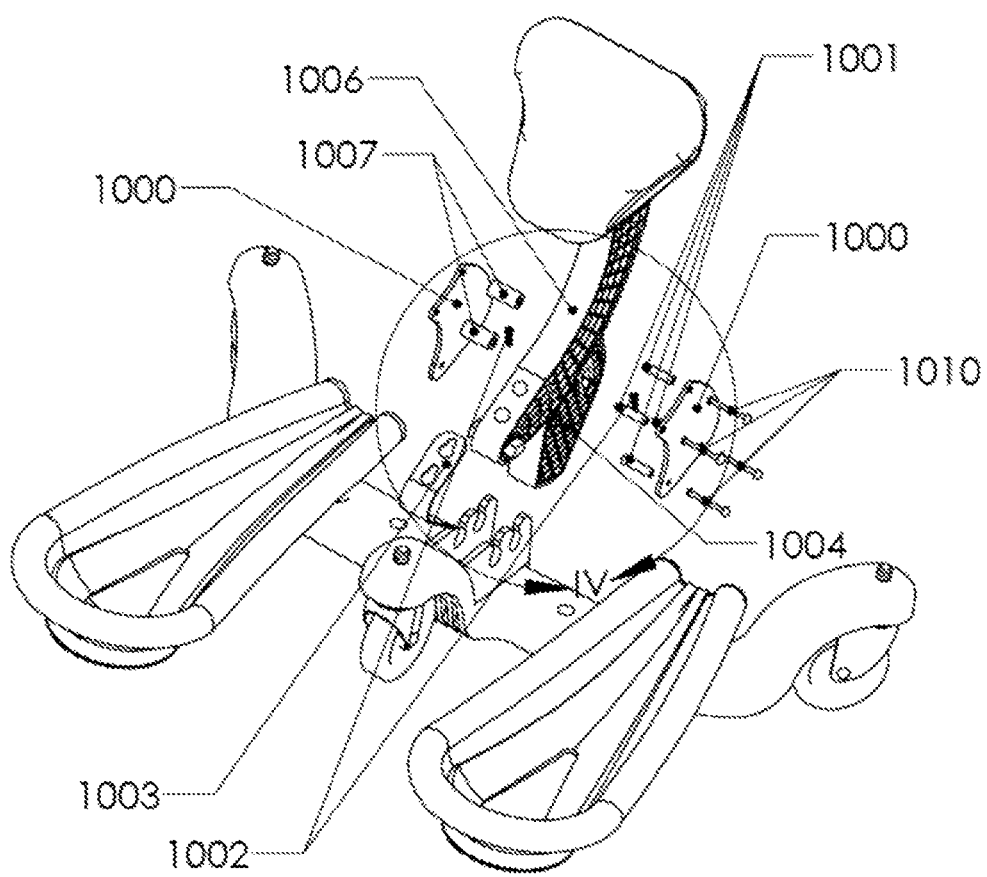
Figure 12B:
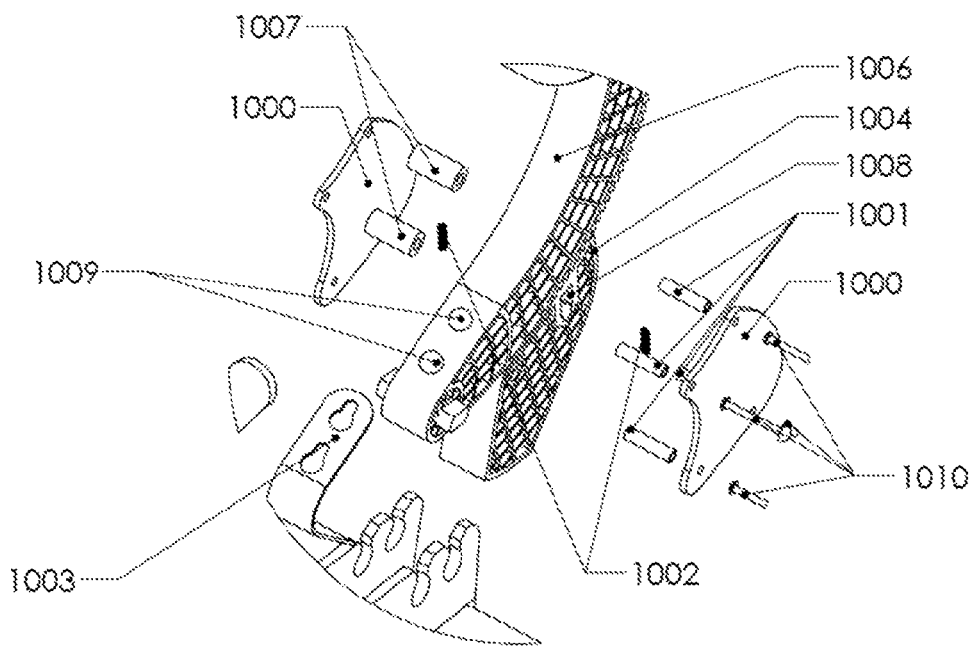

FIGS. 12A and 12B illustrate an alternative embodiment for adjusting the height of the back support member using a ratcheting mechanism. Seat arm 1006 engages with seat foot 1004 with mating gears or teeth. Adjustments may be made when the user applies a downward force to the seat foot 1004. The downward force causes the seat foot 1004 to pivot on spacers 1001 compressing compression springs 1002 that are located in the seat foot pockets 1008. The compressed springs allow separation of the matting gears in both the seat arm 1006 and the seat foot 1004 allowing the user to adjust the position of the back support member. The spacers 1001 ensure the guide rollers 1007 and the seat foot 1004 are free floating between the end caps 1000. This allows the seat foot 1004 to travel smoothly along the seat arm 1006. Solid rivets 1010 may be used to hold the seat foot adjustment mechanism together. A tab on torsion spring 1003 can be snapped onto the seat arm 1006 using "P slots" as shown. The torsion spring 1003 helps ensure that the seat adjustment foot 1004 does not drag on the surface of the floor when the user is in motion on the cart. One of skill in the art will now readily recognize other means to adjust the seat height and keep the seat foot from engaging work surface.

One of skill in the art will appreciate a variety of modifications that fall within the scope of these descriptions and claims. Further, one of skill in the art will appreciate that the various elements of the embodiments described herein may be interchanged to form other embodiments that fall within the scope of the invention.

The invention claimed is:

1. A cart comprising:
    a rear base member with proximal and distal ends,
    wheels attached to the proximal and distal ends of the rear base member,
    a central base member with proximal and distal ends,
    the distal end of the central base member attached perpendicular to the rear base member at the central portion of the rear base member,
    the central base member comprising a wheel at the proximal end,
    a first shin support with proximal and distal ends attached to the rear base member at the distal end of said first shin support and between the proximal end and the central portion of the rear base member, and
    a second shin support with proximal and distal ends attached to the rear base member at the distal end of said second shin support and between the distal end and the central portion of the rear base member.

2. The cart of claim 1 further comprising a back support member attached to the central portion of the rear base member and extending vertically therefrom.

3. The cart of claim 1 wherein said wheels are pivotally attached.

4. The cart of claim 1 wherein said wheels are replaced by stationary feet.

5. The cart of claim 2 wherein said back support member is hingeably attached to said central base member.

6. The cart of claim 5 wherein said back support member further comprises a back support attached thereto.

7. The cart of claim 1 wherein said first and second shin supports are pivotably attached to said rear base member and pivot from side to side.

8. The cart of claim 7 wherein said first and second shin supports are flexible to contact the proximal ends of said first and second shin supports with the ground or work surface.

9. The cart of claim 7 wherein said shin supports are attached to said rear base member with torsion joints.

10. The cart of claim 2 wherein the back support member further comprises a height adjustment.

11. A cart comprising:
    a rear base member with proximal and distal ends,
    wheels pivotally attached to the proximal and distal ends of the rear base member,
    a central base member with proximal and distal ends,
    the distal end of the central base member attached perpendicular to the rear base member at the central portion of the rear base member,
    the central base member comprising a wheel pivotally attached at the proximal end,
    a back support member hingeably attached to the central portion of the rear base member and extending vertically therefrom,
    the back support member further comprising a back support attached thereto, a first shin support with proximal and distal ends pivotably attached to the rear base member at the distal end of said first shin support and between the proximal end and the central portion of the rear base member, and
    a second shin support with proximal and distal ends pivotably attached to the rear base member at the distal end of said second shin support and between the distal end and the central portion of the rear base member.

12. The cart of claim 11 wherein the height of said back support is adjustable.

13. The cart of claim 11 wherein said rear base member is foldable.

14. The cart of claim 8 further comprising grip soles mounted on the proximal ends of said shin supports, wherein said grip soles rotate about their axes.

* * * * *